United States Patent
Soroushian et al.

(10) Patent No.: US 9,464,000 B2
(45) Date of Patent: Oct. 11, 2016

(54) AUGMENTED CEMENTITIOUS BINDER COMPOSITIONS AND RELATED METHODS

(71) Applicant: BOARD OF TRUSTEES OF MICHIGAN STATE UNIVERSITY, East Lansing, MI (US)

(72) Inventors: Parviz Soroushian, Okemos, MI (US); Iman Harsini, East Lansing, MI (US); Amirpasha Peyvandi, Baton Rouge, LA (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 14/790,190

(22) Filed: Jul. 2, 2015

(65) Prior Publication Data
US 2016/0009594 A1    Jan. 14, 2016

Related U.S. Application Data

(60) Provisional application No. 62/022,865, filed on Jul. 10, 2014.

(51) Int. Cl.
| | |
|---|---|
| *C04B 14/22* | (2006.01) |
| *C04B 7/52* | (2006.01) |
| *C04B 28/04* | (2006.01) |

(52) U.S. Cl.
CPC ............... *C04B 7/527* (2013.01); *C04B 28/04* (2013.01); *Y02P 40/145* (2015.11)

(58) Field of Classification Search
CPC ..... C04B 14/22; C04B 22/00; C04B 22/062; C04B 22/064; C04B 22/0093; C04B 22/10; C04B 22/106; C04B 22/124; C04B 22/126; C04B 22/142; C04B 22/143; C04B 22/147; C04B 7/527; C04B 12/04; C04B 14/28; C04B 20/008; C04B 24/04; C04B 28/04; C04B 2103/0088
See application file for complete search history.

(56) References Cited

U.S. PATENT DOCUMENTS

| | | | |
|---|---|---|---|
| 5,810,921 A | 9/1998 | Baxter et al. | |
| 2003/0037708 A1* | 2/2003 | Monawar | C04B 28/02 106/713 |
| 2003/0041783 A1* | 3/2003 | Monawar | C04B 14/106 106/716 |
| 2008/0072800 A1* | 3/2008 | Hughes | C04B 28/02 106/816 |

FOREIGN PATENT DOCUMENTS

| | | | |
|---|---|---|---|
| JP | 04-280844 A | * | 10/1992 |
| WO | WO 2013/008118 A | * | 1/2013 |

OTHER PUBLICATIONS

Derwent-Acc-No. 2014-L84237, abstract of Chinese Patent Specification No. CN 103755285 A (Apr. 2014).*
Johnston, C. D., "Waste Glass as Coarse Aggregate for Concrete," *ASTM Journal of Testing and Evaluation*, 2(5):344-350 (1974).
Soroushian, P., "Towards Broad Use of Recycled Glass Concrete on MSU Campus (Innovation in Sustainability Seed Grand)," pp. 1-49 (Dec. 2012).

* cited by examiner

*Primary Examiner* — Anthony J Green
(74) *Attorney, Agent, or Firm* — Marshall, Gerstein & Borun LLP

(57) ABSTRACT

The disclosure relates to cementitious binder compositions, related concrete compositions, and related methods. The cementitious binder includes a cement augmented with particulate glass (e.g., mixed color waste glass) and a reactive particulate mineral and/or metal salt such as sodium bicarbonate or calcium carbonate. The cementitious binder can be combined with aggregate and used to form corresponding (cured) concrete compositions. Inclusion of the reactive particulate material improves the set time and early-age strength development of the cured compositions.

33 Claims, 3 Drawing Sheets

AUGMENTED CEMENTITIOUS BINDER COMPOSITIONS AND RELATED METHODS

CROSS REFERENCE TO RELATED APPLICATION

Priority is claimed to U.S. Provisional Application No. 62/022,865 filed on Jul. 10, 2014, which is incorporated by reference herein in its entirety.

STATEMENT OF GOVERNMENT INTEREST

None.

BACKGROUND OF THE DISCLOSURE

1. Field of the Disclosure

The disclosure generally relates to cementitious binder compositions, related concrete compositions, and related methods. The cementitious binder includes a cement augmented with particulate glass and a reactive particulate mineral and/or metal salt. The cementitious binder can be combined with aggregate and used to form corresponding (cured) concrete compositions.

2. Brief Description of Related Technology

Concrete, a primary construction material, is the world's most consumed man-made material. About 800 million tons of concrete was consumed in the U.S. in 2007, and the world consumption was estimated at 11 billion tons, or approximately 1.7 tons for every living human being. Production of cement (the binder in concrete) is an energy-intensive and highly polluting process, which contributes about 5 to 8% to global carbon dioxide (CQ) emissions, and accounts for 3% of total (5% of industrial) energy consumption worldwide. Production of each ton of cement emits one ton of carbon dioxide to the atmosphere. Manufacturing of cement is also an energy-intensive process, which ranks third after aluminum and steel production in terms of energy consumption. Close to 5.5 million BTU of energy is consumed for production of a ton of cement. The energy used for production of cement accounts for more than 90% of the total energy required for production of concrete. In spite of major efforts in recent decades, significant gains in the fuel-efficiency of cement production plants have not been realized.

Growing environmental concerns encourage recycling of the landfill-bound constituents of the municipal solid waste stream, including glass. Waste glass can be conveniently collected in mixed color. Mixed-color waste glass, however, is of limited value in glass production, because it would require a costly color-selective separation step prior to glass production (i.e., to form a recycled glass having a desired single color such as amber, green, colorless, etc.).

SUMMARY

The disclosure generally relates to cementitious binder compositions, related concrete compositions, and related methods. The cementitious binder includes a cement augmented with particulate glass and a reactive particulate mineral and/or metal salt. The cementitious binder can be combined with aggregate and used to form corresponding (cured) concrete compositions.

A blend of particulate milled waste glass and a reactive particulate mineral or metal salt powder (e.g., (sodium) bicarbonate, (calcium) carbonate such as from limestone), both with micro-scale dimensions, can be used as a partial replacement for cement to enhance the mechanical properties, impermeability, and durability of a resulting concrete while retaining the desired early-age strength and chemistry of concrete environment.

Waste glass, including mixed-color waste glass, offers desired chemical attributes for chemical reactions with cement hydrates which yield concrete materials of enhanced structure and engineering properties. Glass, however, is rich in alkalis, and increases the alkalinity of a concrete pore solution. Partial replacement of cement with milled waste glass also lowers the rate of strength development in concrete, requiring adjustment of construction schedule. The alkali content of glass also increases the alkalinity of the pore solution. While test results indicate that reactions involving glass in a cementitious binder can actually lower the potential for deleterious alkali-silica reactions, the rise in pore solution alkalinity is still a consideration given the high level of concern with alkali-silica reactions. Compositions according to the disclosure blend milled waste glass with a relatively small concentration (e.g., about 5 wt. % to 15 wt. % relative to milled waste glass replacement) of a reactive particulate powder (e.g., a bicarbonate or a carbonate mineral or metal salt) to overcome the problems with slow strength gain of recycled glass concrete. Reactive groups such as bicarbonate or carbonate can introduce carbonic acid into a concrete solution; bicarbonate can produce a buffer solution, and can act as an effective carrier of carbon dioxide from the atmosphere to produce additional carbonic acid and lower the alkalinity of solution. It also acts as an accelerator to increase the rate of strength gain in concrete.

Waste glass (including mixed-color waste glass) is milled to about the particle size of cement (e.g., about 1 μm to 100 μm, about 2 μm to 25 μm, or about 10 μm average particle size). A reactive particulate material (e.g., a bicarbonate or a carbonate mineral or metal salt) is also milled to (or otherwise provided in) the same or substantially similar particle size (e.g., the cement, waste glass, and reactive particulate have similar average sizes and/or size distributions). The waste glass and reactive particulate are blended at a waste glass-to-reactive particulate weight ratio of about 10:1 (e.g., about 5:1 to 15:1). Alternatively, the waste glass and the reactive particulate can be milled together at the desired weight ratio. The blend is then used as replacement for about 10%, 20%, or 30% by weight of cement in concrete production (e.g., about 5 wt. % to 50 wt. % or about 10 wt. % to 30 wt. % relative to total cementitious binder). The cementitious binder with partial waste glass replacement can be combined at the point of cement production and/or use (e.g., in a cement production plant, in a ready-mix concrete plant production plant, in a pre-cast/pre-stressed concrete manufacturing plant).

The disclosed cementitious binder and related methods enable diversion of mixed-color waste glass for value-added use in concrete. Recycled glass concrete offers major advantages in terms of performance, service life, economy, and sustainability. Large-scale implementation of the recycled waste glass as a partial cement replacement can have significant effects on greenhouse gas emissions (e.g., resulting from lower emissions associated with production of cement). The inclusion of the reactive particulate material in combination with the waste glass yields concrete materials of enhanced performance, sustainability and cost without requiring any change in construction schedule while retaining the desired concrete chemistry for avoiding concerns with deleterious alkali-silica reactions.

In one aspect, the disclosure relates to a cementitious binder composition including: (a) a (hydraulic) cement; (b)

a particulate glass composition having an average particle size ranging from about 1 μm to about 100 μm; and (c) a reactive particulate composition including at least one of a reactive particulate metal salt and a reactive particulate mineral composition, the reactive particulate composition having an average particle size ranging from about 1 μm to about 100 μm.

In another aspect, the disclosure relates to a cementitious binder composition including: (a) a hydraulic cement including Portland cement; (b) a particulate glass composition present in an amount ranging from about 5 wt. % to about 50 wt. % relative to the cementitious binder composition and having an average particle size ranging from about 1 μm to about 100 μm; and (c) a particulate sodium bicarbonate composition present in an amount ranging from about 0.5 wt. % to about 10 wt. % relative to the cementitious binder composition and having an average particle size ranging from about 1 μm to about 100 μm.

In another aspect, the disclosure relates to a cementitious binder composition including: (a) a hydraulic cement including Portland cement; (b) a particulate glass composition present in an amount ranging from about 5 wt. % to about 50 wt. % relative to the cementitious binder composition and having an average particle size ranging from about 1 μm to about 100 μm; and (c) a particulate calcium carbonate composition present in an amount ranging from about 0.5 wt. % to about 10 wt. % relative to the cementitious binder composition and having an average particle size ranging from about 1 μm to about 100 μm.

In another aspect, the disclosure relates to a cured binder composition including: at least one of hydration, pozzolanic and carbonation reaction products of water and the cementitious binder composition according to any of the various disclosed embodiments.

In another aspect, the disclosure relates to a concrete composition including: (a) the cementitious binder composition according to any of the various disclosed embodiments; and (b) (concrete) aggregates.

In another aspect, the disclosure relates to a cured concrete composite composition including: (a) a matrix including at least one of hydration, pozzolanic and carbonation reaction products of water and the cementitious binder composition according to any of the various disclosed embodiments; (b) aggregates distributed throughout the matrix; and (c) optionally one or more additives selected from the group consisting of chemical additives, mineral additives, fibrous additives, and combinations thereof.

In another aspect, the disclosure relates to method for curing a cementitious binder composition, the method including: (a) applying a cementitious binder composition according to any of the various disclosed embodiments and further including water to a substrate (e.g., casting the composition further including water into a mold); and (b) curing the cementitious binder composition for a selected period (e.g., for a specified time and/or under specified conditions), thereby forming a cured cement-based composition including a cementitious matrix including at least one of the hydration, pozzolanic and carbonation reaction products of the cementitious binder composition and the water therein. In a refinement, (i) the cementitious binder composition is in the form of a concrete composition further including aggregates; and (ii) curing the concrete composition for the selected period forms a cured concrete composition including the cementitious matrix and the aggregates embedded within the cementitious matrix.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
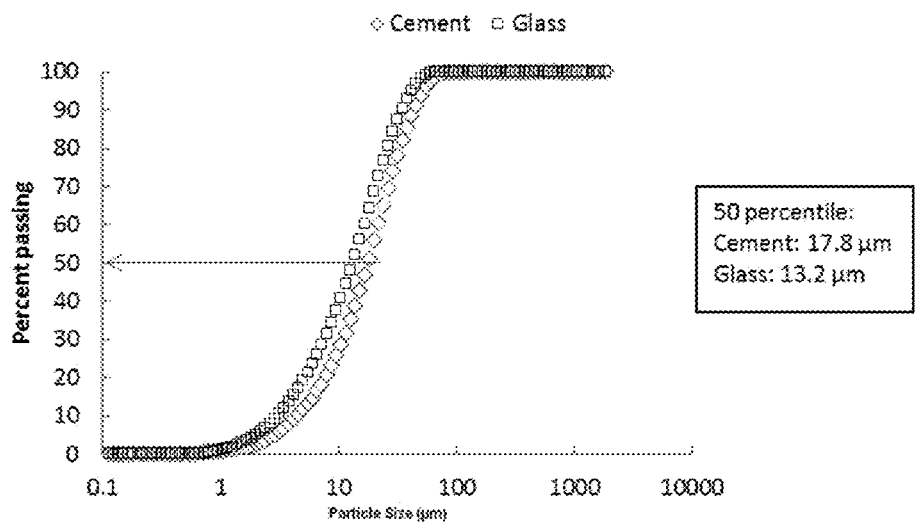
FIG. 1 is a graph illustrating representative cumulative particle size distributions for Portland cement and milled waste glass for use in the disclosed cement compositions.

While the disclosed compositions and methods are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

The disclosure generally relates to cementitious binder compositions, related concrete compositions, and related methods. The cementitious binder includes a cement augmented with particulate glass and a reactive particulate mineral and/or metal salt. The cementitious binder can be combined with aggregate and used to form corresponding (cured) concrete compositions.

The use of solid waste materials or industrial by-products as a partial replacement for cement in concrete is a viable strategy for reducing the production and use of (Portland) cement, thus reducing the environmental and energy impacts of concrete production. Mixed-color waste glass offers desired chemical composition and reactivity for use as a supplementary cementitious material that is capable of enhancing the chemical stability, pore system characteristics, moisture resistance and durability of concrete.

Early efforts to recycle waste glass in concrete have focused on the use of crushed glass as replacement for aggregates in concrete. These efforts neglected the reactive nature of glass in a cement-based matrix, which was slowed down due to the relatively large (millimeter-scale) size of glass particles. Such gradual reactions proved to be detrimental to the long-term stability of concrete incorporating relatively large (crushed) glass particles. Milling of glass to micrometer-scale particle size, for accelerating the reactions between glass and cement hydrates, can accelerate the chemical reactions so that they occur at about the same time as hydration of cement. This enables partial replacement of cement with milled waste glass in concrete, and offers major energy, environmental and cost benefits. Besides the benefits associated with reducing the energy and environmental impacts of cement production, recycling of each ton of glass saves over one ton of natural resources.

The compatible chemistry of glass and cement as well as the amorphous nature of glass promote successful use of milled waste glass as a partial replacement for cement in concrete. Silica-rich glass offers desired pozzolanic qualities for beneficial reactions with cement hydrates. Percentages of the three key oxides ($SiO_2$, $Al_2O_3$ and $CaO$) in glass sum to meet the required ASTM C618 minimum for pozzolans.

Once finely ground, glass offers a viable chemical composition for beneficial pozzolanic reactions with cement hydrates. Mixed-color waste glass, when milled to a relatively small micron-scale particle size (e.g., average particle size 1 µm to 100 µm, such as less than 40 µm or less than 25 µm), exhibits satisfactory pozzolanic reactivity for use as partial replacement for (Portland) cement in concrete (e.g., 5 wt. % to 50 wt. %, such as about 10 wt. %, 20 wt. %, or 30 wt. % relative to total cementitious binder). The resulting 'recycled glass concrete' provides improved mechanical performance, impermeability and durability when compared with normal concrete. The pozzolanic reactions of milled waste glass with cement hydrates produce calcium silicate hydrate with improved binding capability and chemical stability.

The relatively high alkali content of glass distinguishes it from other pozzolans currently used as supplementary cementitious materials. Partial replacement of milled mixed-color waste glass in concrete produces a slight rise in the pH of concrete pore solution. In spite of this, recycled glass concrete performs better than normal concrete in terms of resistance to alkali-silica reaction (when reactive aggregates are used in concrete). One can attribute this to the consumption of calcium hydroxide by pozzolanic reactions of silica-rich glass. Some glass augmentation methods which are the subject of this disclosure, including addition of sodium bicarbonate, can lower the alkalinity of a concrete pore solution by promoting dissolution and beneficial carbonation reactions of the carbon dioxide in air during hydration of cement.

While recycled glass concrete surpasses normal concrete in terms of long-term barrier, durability and mechanical properties, it falls short as far as early-age setting and strength development are concerned when milled glass is used alone as a partial cement replacement. The slow rate of recycled glass concrete setting and strength development delays the construction process, and carries a cost penalty.

In order to overcome drawbacks associated with the slow rate of strength development in recycled glass concrete, the (mixed-color) waste glass according to the disclosure is augmented through addition of reactive particulate materials (e.g., sodium bicarbonate powder, calcium carbonate powder, or other minerals). While not being bound to any particular theory, it is hypothesized that modification of milled mixed-color waste glass with reactive particulates accelerates the rate of hydration and early-age strength development in recycled glass concrete by synergistic actions of the two involving at least one of the following mechanisms: (i) release of bicarbonate anions by reactive particulates to accelerate curing of cementitious materials by increasing the rate of dissolution, inducing accelerated carbonation reactions, and potentially promoting the dissolution of carbon dioxide from air to sustain accelerated carbonation reactions, where the carbonation reactions transform: (a) the aluminosulfate hydration phases of cement (Afm and Aft) into carboaluminates at the expense of monosulfate (while stabilizing Aft), with this effect amplified by the additional aluminates brought into the system by glass during its pozzolanic reactions (enabling persistence of the beneficial reactive particulate effects in recycled glass concrete over time), and (b) the calcium hydroxide hydration phases of cement into calcium carbonate; (ii) action of reactive particulates as nucleation sites to increase the probability of dissolved C—S—H encountering and precipitating on solid particles; (iii) dissolution of reactive particulates to increase the solubility of anhydrous cementitious materials and subsequent hydration reactions of the resulting ions; and (iv) activation of geopolymerization mechanisms which complement conventional hydration and pozzolanic reactions towards improvement of early-age properties of recycled glass concrete.

Augmentation of glass with sodium bicarbonate also offers the potential for increased dissolution of carbon dioxide from air into the fresh concrete solution. The resulting early-age carbonation reactions, complemented with the pozzolanic reactions of glass, promise to counteract the effects of the sodium content of glass, restoring the alkalinity of a pore solution to levels that are not significantly different from those of normal concrete. In addition, the strong alkali-binding capacity of the products of pozzolanic and carbonation reactions further reduce the alkalinity of the recycled glass concrete pore solution to levels close to those of conventional concrete.

Cementitious Binder

In one aspect, the disclosure relates to a cementitious binder composition including: (a) a (hydraulic) cement; (b) a particulate glass composition having an average particle size ranging from about 1 µm to about 100 µm; and (c) a reactive particulate composition including at least one of a reactive particulate metal salt and a reactive particulate mineral composition, the reactive particulate composition having an average particle size ranging from about 1 µm to about 100 µm.

In another aspect, the disclosure relates to a cementitious binder composition including: (a) a hydraulic cement including Portland cement; (b) a particulate glass composition present in an amount ranging from about 5 wt. % to about 50 wt. % relative to the cementitious binder composition and having an average particle size ranging from about 1 µm to about 100 µm; and (c) a particulate sodium bicarbonate composition present in an amount ranging from about 0.5 wt. % to about 10 wt. % or 20 wt. % relative to the cementitious binder composition and having an average particle size ranging from about 1 µm to about 100 µm.

In another aspect, the disclosure relates to a cementitious binder composition including: (a) a hydraulic cement including Portland cement; (b) a particulate glass composition present in an amount ranging from about 5 wt. % to about 50 wt. % relative to the cementitious binder composition and having an average particle size ranging from about 1 µm to about 100 µm; and (c) a particulate calcium carbonate composition present in an amount ranging from about 0.5 wt. % to about 10 wt. % or 20 wt. % relative to the cementitious binder composition and having an average particle size ranging from about 1 µm to about 100 µm.

In another aspect, the disclosure relates to a cured binder composition including: a hydration reaction product of water and the cementitious binder composition according to any of the various disclosed embodiments (e.g., where water was present prior to hydration in an amount ranging from about 10 wt. % to about 65 wt. % relative to the cementitious binder composition).

The various components of the disclosed compositions (e.g., cement, particulate glass composition, reactive particulate composition, aggregate) can be characterized by one or more size distribution parameters. A general size parameter can represent the size distribution characteristic of a specific material for all of the material in the cementitious binder and/or concrete compositions or only the material having a size less than about 30, 50, 70, or 100 μm (e.g., to exclude contribution of a component from a larger-sized source such as concrete aggregate, such as calcium carbonate from limestone aggregate). A particle size can be expressed as a diameter $D_n$ (or an effective/volume-equivalent diameter/size) of a cumulative distribution (e.g., 0<n<100 where n represents the percent undersize (cut size), such as $D_5$, $D_{10}$, $D_{50}$ (average/median), $D_{90}$, $D_{95}$). The distribution and corresponding distribution parameters can be number-, surface area-, volume-, or weight-based (e.g., commonly a weight-based distribution). Size distributions can be determined by any suitable method such as sieving (giving a weight-based size distribution) and optical detection (e.g., laser diffraction or other light scattering technique, microscopy).

Various refinements and extensions of the disclosed cement in the cementitious binder compositions are possible. For example, the (hydraulic) cement component can be present in an amount ranging from about 50 wt. % to about 95 wt. % relative to the cementitious binder composition (e.g., at least about 50%, 60%, 70%, or 80% and/or up to about 80%, 90%, or 95% by weight relative to the cementitious binder composition). The cement suitably has an average particle size ranging from about 1 μm to about 100 μm or about 2 μm to about 25 μm. For example, the cement can have a $D_{50}$ of at least about 1, 2, 5, 8, or 10 μm and/or up to about 15, 20, 25, 50, or 100 μm (e.g., alternatively or additionally a $D_5$ or $D_{10}$ of at least about 0.5, 1, or 2 μm and/or up to about 1, 2, or 5 μm, a $D_{90}$ or $D_{95}$ of at least about 30, 40, or 60 μm and/or up to about 50, 70, 100, or 200 μm).

The particular type of cement is not particularly limited. In various embodiments, the cement be a hydraulic cement such as general use (GU) hydraulic cement, high early strength (HE) hydraulic cement, moderate sulfate resistance (MS) hydraulic cement, high sulfate resistance (HS) hydraulic cement, moderate heat of hydration (MH) hydraulic cement, low heat of hydration (LH) hydraulic cement, and combinations thereof. In an embodiment, the cement can be Portland cement (e.g., Type I), for example including about 25% or 50% to 60% $C_3S$, about 15% to 25% or 50% $C_2S$, about 2% or 5% to 12% $C_3A$, about 5% to 15% $C_4AF$, about 1% to 5% M, about 0.5% to 1.5% C, and/or about 1% to 5% sulfur trioxide, all by weight (notation: C (CaO), S ($SiO_2$), A ($Al_2O_3$), F ($Fe_2O_3$), and M (MgO)). The Portland cement can include one or more of Type I Portland cement, Type II Portland cement, Type III Portland cement, Type IV Portland cement, Type V Portland cement, Type IS Portland blast furnace slag cement, Type IP Portland-pozzolan cement, Type IT Ternary blended cement, and combinations thereof. Portland cement types are generally defined according to ASTM C150 standards. Representative compositions include: about 55% ($C_3S$), 19% ($C_2S$), 10% ($C_3A$), 7% ($C_4AF$), 2.8% M, 2.9% ($SO_3$), and 1.0% free C (Type I); about 51% ($C_3S$), 24% ($C_2S$), 6% ($C_3A$), 11% ($C_4AF$), 2.9% M, 2.5% ($SO_3$), and 1.0% free C (Type II); about 57% ($C_3S$), 19% ($C_2S$), 10% ($C_3A$), 7% ($C_4AF$), 3.0% M, 3.1% ($SO_3$), and 1.3% free C (Type III); about 28% ($C_3S$), 49% ($C_2S$), 4% ($C_3A$), 12% ($C_4AF$), 1.8% M, 1.9% ($SO_3$), and 0.8% free C (Type IV); and 38% ($C_3S$), 43% ($C_2S$), 4% ($C_3A$), 9% ($C_4AF$), 1.9% M, 1.8% ($SO_3$), and 0.8% free C (Type V).

In an embodiment, the cementitious binder can further include a supplementary cementitious material such as fly ash, ground granulated blast furnace slag, silica fume, rice husk ash, metakaolin, spent fluid catalytic cracking catalyst (petroleum production byproduct), and combinations thereof. The supplementary cementitious material suitably is present in an amount of at least about 5%, 10%, or 15% and/or up to about 20%, 30%, or 50% by weight relative to the total cement and supplementary cementitious material combined. Alternatively or additionally the supplementary cementitious material can be present in an amount of at least about 5%, 10%, or 20% and/or up to about 25%, 40%, 60%, or 100% by weight relative to the cement (e.g., Portland cement or otherwise). The amount of cement as a basis for other concentrations as disclosed herein can include the cement and the supplementary cementitious material combined.

Various refinements and extensions of the disclosed particulate glass in the cementitious binder compositions are possible. For example, the particulate glass composition can be present in an amount ranging from about 5 wt. % to about 50 wt. % relative to the cementitious binder composition. For example, the particulate glass composition can be at least about 5%, 10%, or 15% and/or up to about 20%, 25%, 30%, 40% or 50% by weight relative to the cementitious binder composition (e.g., about 5 wt. % to 15 wt. %, about 15 wt. % to 25 wt. % or about 25 wt. % to 35 wt. %). Alternatively or additionally the particulate glass composition can be at least about 5%, 10%, 20% or 30% and/or up to about 25%, 35%, 45% or 55% by weight relative to the cement. The particulate glass concentration can represent all particulate glass in the cement composition or only the particles having a size less than about 30, 50, 70, or 100 μm and/or having a selected size distribution characteristic. The particulate glass composition suitably has an average particle size ranging from about 1 μm to about 100 μm or about 5 μm to about 25 μm. The particulate glass suitably has an irregular, quasi-spherical shape (e.g., a non-fibrous shape generally as would result from grinding, such as having a L/D aspect ratio less than about 2, 5, or 10). In other embodiments, the particulate glass can have a fibrous shape (e.g., where the (average) particle size corresponds the (average) fiber diameter and the fibrous L/D aspect ratio is at least about 5, 10, 50, 100, 200, or 500 and/or up to about 50, 100, 200, 500, 1000, or 5000). For example, the particulate glass composition can have a $D_{50}$ of at least about 1, 2, 5, 8, or 10 μm and/or up to about 12, 16, 20, 25, 50, or 100 μm (e.g., alternatively or additionally a $D_5$ or $D_{10}$ of at least about 0.5, 1, or 2 μm and/or up to about 1, 2, or 5 μm, a $D_{90}$ or $D_{95}$ of at least about 20, 30, or 40 μm and/or up to about 40, 60, 80, 100, or 200 μm).

The particular type of particulate glass is not particularly limited. In various embodiments, the particulate glass composition can include mixed-color waste glass (e.g., post-consumer waste glass; two or more colors blended together such as clear/colorless, green, amber, flint). Use of mixed-color waste glass eliminates the need to segregate colors for recycling as a new glass product while permitting a secondary re-use of the glass as a partial cement replacement and avoiding disposal costs for the same. In a refinement, the particulate glass can be a soda-lime glass (e.g., including about 70% to 76% $SiO_2$, about 7% to 14% CaO, about 0.1% or 2% to 6% MgO, and/or about 10% to 16% $Na_2O$ all by weight).

Various refinements and extensions of the disclosed reactive particulate composition in the cementitious binder compositions are possible. For example, the reactive particulate composition can be present in an amount ranging from about 0.1 wt. % to about 20 wt. % relative to the cementitious binder composition. For example, the reactive particulate composition can be at least about 0.1%, 0.2%, 0.4%, 0.5%, 1%, or 1.5% and/or up to about 2%, 3%, 4%, 6%, 10% or 20% by weight relative to the cementitious binder composition. Alternatively or additionally the reactive particulate composition can be at least about 0.4%, 0.5%, 1%, or 1.5% and/or up to about 2.5%, 4%, 6%, 9%, 15%, or 25% by weight relative to the cement. The concentration can represent all particulate metal salts and/or minerals in the cement composition or only the particles having a size less than about 30, 50, 70, or 100 μm and/or having a selected size distribution characteristic. The reactive particulate composition can have an average particle size ranging from about 1 μm to about 100 μm or about 5 μm to about 20 μm. For example, the particulate composition can have a $D_{50}$ of at least about 1, 2, 5, 8, or 10 μm and/or up to about 12, 16, 20, 25, 50, or 100 μm; alternatively or additionally a $D_5$ or $D_{10}$ of at least about 0.5, 1, or 2 μm and/or up to about 1, 2, or 5 μm, a $D_{90}$ or $D_{95}$ of at least about 20, 30, or 40 μm and/or up to about 40, 60, 80, 100, or 200 μm).

In various embodiments, the reactive particulate composition includes a reactive particulate metal salt, such as a metal salt including an alkali metal, an alkali earth metal, and combinations thereof (e.g., Li, Na, K, Rb, Cs, Fr, Be, Mg, Ca, Sr, Ba, Ra; these and other metals generally present in the particulate metal salt and/or mineral composition in an ionic (cationic) or oxidized state (positive oxidation level)). In a refinement, the metal can include sodium, potassium, magnesium, calcium, and/or aluminum. Further, the reactive particulate metal salt can include an anion from among carbonate, bicarbonate, nitrate, hydroxide, chloride, fluoride, sulfate, bisulfate, formate, aluminate, silicate, and combinations thereof. (e.g., suitably carbonate or bicarbonate; alternatively free from halogens such as chlorine and/or fluorine).

Examples of specific reactive particulate compositions include sodium bicarbonate, sodium silicate, calcium carbonate, calcium chloride, calcium formate, calcium hydroxide, metakaolin, sodium carbonate, sodium aluminate, and combinations thereof. In some embodiments, the reactive particulate composition (e.g., and the corresponding cementitious binder and/or concrete composition) includes, consists of, or consists essentially of sodium bicarbonate. In some embodiments, the reactive particulate composition (e.g., and the corresponding cementitious binder and/or concrete composition) includes, consists of, or consists essentially of calcium carbonate.

In some embodiments, the reactive particulate composition can be activated in an alkaline environment of the cementitious binder. The reactive particulate composition can be substantially insoluble in water under conditions when the cementitious binder formed into a paste (e.g., pH, concentration, presence of other species), such as where about 5%, 2%, 1%, 0.1% or less of the particulate metal salt and/or mineral composition present in the paste dissolves (e.g., where insoluble reactive metal salt/mineral particles can form nucleation sites during cement hydration).

In various refinements, other chemical, mineral, and/or fibrous additives can be included in the cementitious binder and/or concrete composition. Representative additive levels ranging from about 0.1 wt. % to about 5 wt. % relative to the cementitious binder. Suitable additives include chemical admixtures as generally known in the art, for example including accelerators, retarders, air entrainers, plasticizers, pigments, corrosion inhibitors, bonding agents, and/or pumping aids. Similarly, additives including dispersed reinforcements such as steel fibers, glass fibers, plastic fibers, or other fibers may be included to improve mechanical strength of an eventual concrete composition.

As described above, the cement, particulate glass composition, and reactive particulate composition (e.g., any 2 or all 3 of the foregoing) can have similar sizes/size distributions in the cementitious binder composition. For example, the ratio of the average particle size of the reactive particulate composition to the average particle size of the particulate glass composition can range from about 0.1, 0.2, or 0.5 to about 1, 2, 5, or 10. For example the ratios $D_{10,particulate}/D_{10,glass}$, $D_{50,particulate}/D_{50,glass}$, and/or $D_{90,particulate}/D_{90,glass}$ more generally can independently be at least 0.5, 0.6, 0.8, or 0.9 and/or up to 1.1, 1.25, 1.6, 2, 3, or 5. Analogous relationships can apply to the cement/particulate combination and/or the cement/glass combination. When different particulate species have similar sizes in the cementitious binder (e.g., as a result of milling or otherwise), they also have similar specific surface areas ($m^2/g$ particle), thus promoting surface-limited heterogeneous hydration reactions at similar rates during curing. Conversely, substantially different sizes could result in the larger particle being rate-limiting, resulting in potentially wasted energy in milling the smaller particles to a size smaller than necessary for promoting glass-salt/mineral-cement interactions in a particular cementitious binder composition.

The cementitious binder can be in a hydrated or an anhydrous form. For example, the cementitious binder composition can be in the form of a particulate/powder composition substantially free from water (e.g., a particulate/powder mixture of the cement, particulate glass, reactive particulate metal salt and/or mineral, and any other additives; generally free from added water, such as only having a water content at equilibrium moisture level with environmental moisture). Alternatively, the cementitious binder composition can include (added) water (e.g., an added amount of water that is sufficient for the purpose of forming a hardened cementitious material, such as an amount sufficient to form a pourable or shapable paste-like or slurry material). For example, the water can be present in an amount ranging from about 10 wt. % to about 60 wt. % relative to the cementitious binder (e.g., at least about 10%, 20%, or 25% and/or up to about 30%, 40%, 50%, 60%, or 70% by weight relative to the cement; alternatively or additionally at least about 10%, 15%, or 20% and/or up to about 25%, 30%, 35%, 40%, 50%, or 60% by weight relative to the cementitious binder composition including the added water).

Concrete Compositions

In another aspect, the disclosure relates to a concrete composition including: (a) the cementitious binder composition according to any of the various disclosed embodiments; and (b) (concrete) aggregates.

In another aspect, the disclosure relates to a cured concrete composite composition including: (a) a matrix including a hydration reaction product of water and the cementitious binder composition according to any of the various disclosed embodiments (e.g., where water was present prior to hydration in an amount ranging from about 10 wt. % to about 65 wt. % relative to the cementitious binder composition); (b) aggregates distributed throughout the matrix; and (c) optionally one or more additives selected from the group consisting of chemical additives, mineral additives, polymeric additives, fibrous additives, and combinations thereof.

In a refinement, the aggregate is selected from the group consisting of crushed stone, gravel, sand, light-weight aggregates, heavy-weight aggregates, synthetic particles, recycled particles, and combinations thereof. The aggregate can be classified/selected according to an aggregate characteristic size, which can correspond, for example, to the largest, median, or smallest size particle in the aggregate particle size distribution, such as 37.5 mm (1.5 in sieve passing), 25.0 mm (1 in), 19.0 mm (0.75 in), 12.5 mm (0.5 in), 9.5 mm (0.375 in), 4.75 mm (No. 4), 2.36 mm (No. 8), 1.18 mm (No. 16), 0.60 mm (No. 30), 0.30 mm (No. 50), 0.15 mm (No. 100), 0.075 mm (No. 200), or ranges therebetween, based on standard sieve sizes/techniques. The aggregate generally includes a combination of sand (fine aggregate) and stone/gravel (coarse aggregate). The aggregate suitably is present in an amount ranging from about 25 wt. % to about 1000 wt. % relative to the cementitious binder (e.g., at least about 50%, 100%, 200%, 300%, or 400% and/or up to about 200%, 300%, 400%, 500%, 600%, or 800% by weight relative to the cementitious binder). Such amounts can apply to an anhydrous concrete composition, a hydrated concrete composition (e.g., pourable mixture to be applied to a substrate), and/or to a cured concrete composition.

The concrete composition can be in a hydrated or an anhydrous form. For example, the concrete composition can be in the form of a particulate composition substantially free from water (e.g., a particulate/powder mixture of the cement binder, particulate glass, particulate metal salt and/or mineral, aggregate, and any other additives; generally free from added water, such as only having a water content at equilibrium moisture level with environmental moisture). Alternatively, the concrete composition can further include (added) water (e.g., about 10 wt. % to about 65 wt. % relative to the cementitious binder composition as noted above).

Cured Compositions

In another aspect, the disclosure relates to method for curing a cementitious binder composition, the method including: (a) applying a cementitious binder composition according to any of the various disclosed embodiments (e.g., further including water in the binder composition) to a substrate or other surface; and (b) curing the cementitious binder composition for a selected period, thereby forming a cured cement-based composition including a cementitious matrix as a hydration reaction product of the cementitious binder composition and the water therein. In a refinement, (i) the cementitious binder composition is in the form of a concrete composition further including aggregates; and (ii) curing the concrete composition for the selected period forms a cured concrete composition including the cementitious matrix and the aggregates embedded within the cementitious matrix.

The surfaces/substrates for application are not particularly limited, and can include any solid surface such as ground or a compacted base (e.g., for laying a road outside, or a building floor, or footing), formwork (e.g., for construction of wall, beam, column, or other structural building element), another cured cement/concrete surface (e.g., for forming a multi-layered structure in road, building, or other context). The applied area can further include one or more reinforcing structures such as bars (e.g., steel, other metal, or composite material) to be contained within the concrete matrix upon curing. Curing can be accomplished in the presence of moisture at ambient or elevated temperature. The selected period for curing can be at least and/or up to 1, 2, 3, 5, 7, 14, or 28 days prior to putting the cured composition into normal use such as a road, floor, structural element, or substrate for further cement/concrete application/curing.

The cured cement-based composition and/or the cured concrete composite composition according to the disclosure can be characterized in terms of their relative strength and/or set time properties.

In some embodiments, the cured cement-based composition or the cured concrete composite composition has a one-day compressive strength ranging from about 60% to 200% of the one-day compressive strength for a corresponding cured cement composition or a corresponding cured concrete composite composition formed without the particulate glass composition and without the reactive particulate composition. For example, the one-day compressive strength can be at least about 70%, 80%, 85%, 90%, 95%, or 100% and/or up to about 100%, 110%, 120%, 130%, 150%, or 200%, and similar ranges can be applied to 2-, 3-, and 7-day relative compressive strength values. The day values reflect the selected curing period between applying and testing the cured composition for compressive strength; compressive strength suitably determined by ASTM C39 (incorporated herein by reference) or equivalent, for example with a cylindrical 3-in (D)×6-in (H) specimen. A corresponding composition for comparison is one in which the glass and the reactive particulate is removed and replaced with cement binder (e.g., along with a consistent water amount, consistent aggregate type/amount, consistent type/amount of any other additives relative to the cement composition used to form the cured composition).

In some embodiments, the cured cement-based composition or the cured concrete composite composition has a one-day compressive strength ranging from about 90% to 200% of the one-day compressive strength for a corresponding cured cement-based composition or a corresponding cured concrete composite composition formed without the reactive particulate composition (e.g., at least about 90%, 95%, 100%, 110%, 120%, or 140% and/or up to about 100%, 120%, 130%, 140%, 160%, or 200%; similar ranges can be applied to 2-, 3-, and 7-day relative compressive strength values; corresponding compositions as above).

In some embodiments, the cement-based composition or the concrete composite composition has an initial set time ranging from about 50% to 200% of the initial set time for a corresponding cement-based composition or a corresponding concrete composite composition formed without the particulate glass composition and without the reactive particulate composition (e.g., preferably less than the corresponding initial set time; for example at least about 50%, 60%, 70%, 80%, 85%, or 90% and/or up to about 95%, 100%, 110%, 120%, 130%, 150%, or 200%; initial and final set times suitably determined by ASTM C403 penetration test (incorporated herein by reference) or equivalent).

In some embodiments, the cement-based composition or the concrete composite composition has an initial set time ranging from about 50% to 120% of the initial set time for a corresponding cement composition or a corresponding concrete composite composition formed without the reactive particulate composition (e.g., preferably less than the corresponding initial set time; for example at least about 50%, 60%, 70%, 80%, 85%, or 90% and/or up to about 95%, 100%, 110%, 120%, 130%, 150%, or 200%).

In some embodiments, the cement-based composition or the concrete composite composition has a final set time ranging from about 50% to 200% of the final set time for a corresponding cement composition or a corresponding concrete composite composition formed without the particulate glass composition and without the reactive particulate composition (e.g., preferably less than the corresponding final set time; for example at least about 50%, 60%, 70%, 80%, 85%, or 90% and/or up to about 95%, 100%, 110%, 120%, 130%, 150%, or 200%).

In some embodiments, the cement-based composition or the concrete composite composition has a final set time ranging from about 50% to 120% of the final set time for a corresponding cement-based composition or a corresponding concrete composite composition formed without the reactive particulate composition (e.g., preferably less than the corresponding final set time; for example at least about 50%, 60%, 70%, 80%, 85%, or 90% and/or up to about 95%, 100%, 110%, 120%, 130%, 150%, or 200%).

EXAMPLES

The following examples illustrate the disclosed compositions and methods, but they are not intended to limit the scope of any claims thereto.

Example 1

Figure 2:
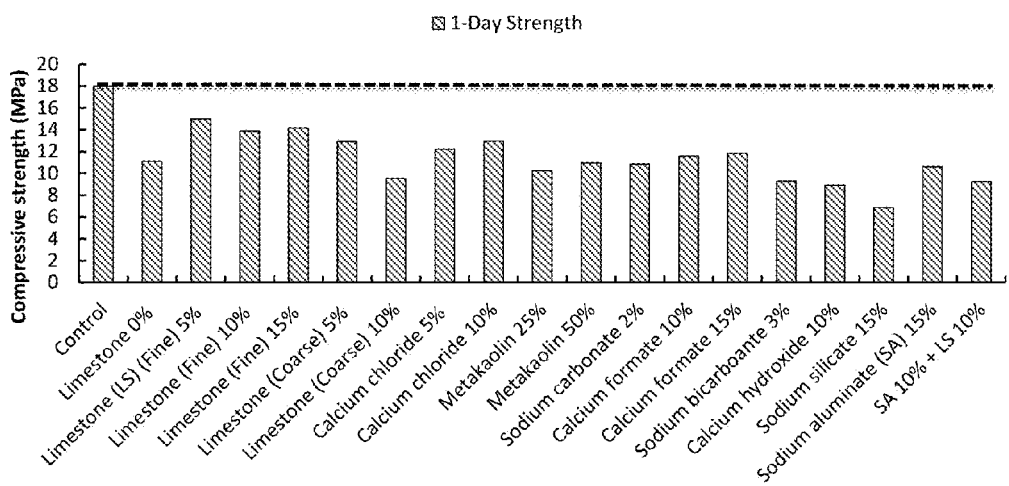
FIG. 2 is a graph illustrating one-day compressive strength test results for cement compositions including a milled waste glass partial cement replacement with or without one or more reactive particulates according to the disclosure (20 wt. % replacement level).
Figure 3:
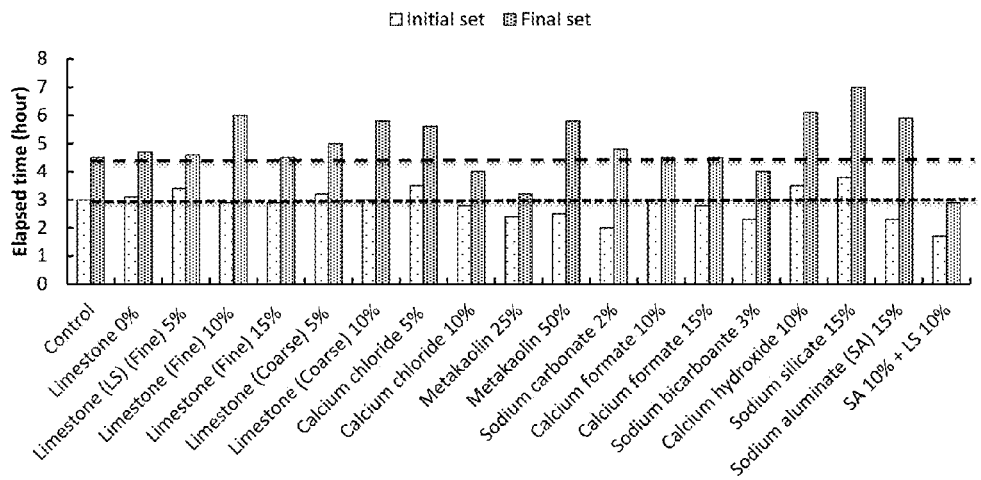
FIG. 3 is a graph illustrating initial and final set time test results for cement compositions including a milled waste glass partial cement replacement with or without one or more reactive particulates according to the disclosure (20 wt. % replacement level).

Limestone powder and several other minerals were evaluated, as partial replacement for cement, for overcoming the drawbacks of recycled glass concrete. Control concrete mixtures (prepared with 100% Portland cement as the cementitious binder) and recycled glass concrete mixtures prepared using 80 wt. % cement and 20 wt. % milled waste glass (without or with one or more augmenting additives) were prepared. The cementitious binder for the recycled glass concrete mixtures includes 80 wt. % Portland cement and 20 wt. % of cement replacement including the milled waste glass and the augmenting additive(s). FIG. 1 presents the particle size distributions of Portland cement and milled waste glass (cumulative weight percent undersize; cement D50 of 17.8 micron and milled waste glass D50 of 13.2 micron). FIGS. 2 and 3 indicate the weight percentage of the augmenting additive(s) relative to the total cement replacement. For example, "Limestone 10%" indicates that he cement replacement includes 90 wt. % waste glass and 10 wt. % limestone (i.e., and the cementitious binder correspondingly includes 80 wt. % Portland cement, 18 wt. % waste glass and 2 wt. % limestone). The one-day compressive strength for the specimens was evaluated using cylindrical specimens of 3-in diameter and 6-in height (ASTM C39). Initial and final set times were also measured using ASTM C403 penetration tests. Crushed limestone was used as coarse aggregate with a maximum size of 19 mm and natural sand was used as fine aggregate with a maximum size of 4.75 mm.

The one-day compressive strength test results are presented in FIG. 2. Fine limestone powder, when used as replacement for 5 wt. % of milled waste glass, is observed to increase the one-day compressive strength of recycled glass concrete above that of the concrete mixture. Fine limestone powder at 10 wt. % replacement of glass, and coarse limestone powder at 5 wt. % replacement level of glass tend to restore the one-day compressive strength of concrete. While some other minerals produce favorable effects on the one-day compressive strength of recycled glass concrete, they do not seem to match the effectiveness of limestone powder in this regard.

FIG. 3 presents the initial and final set-time test results. A number of the minerals considered effectively reduce the set time of concrete (indicating acceleration of hydration reactions). Among those with favorable effects on the one-day compressive strength of concrete, fine limestone powder at 10 wt. % replacement level of glass produces set times which match those of control concrete.

The experimental results suggest that augmentation of milled (mixed-color) waste glass by replacing about 10% (e.g., about 5% to 15%) of waste glass with fine limestone powder produces recycled glass concrete materials which approximately match the one-day compressive strength as well as the initial and final set times of control concrete.

Example 2

Sodium bicarbonate ($NaHCO_3$ or baking soda), was used to augment milled mixed-color waste glass in order to increase the early-age strength and reduce the set time of recycled glass concrete materials incorporating milled waste glass as a partial replacement for cement. As in Example 1, the one-day compressive strength for concrete specimens using the various cementitious binders of Example 2 was evaluated using cylindrical specimens of 3-in diameter and 6-in height (ASTM C39). Initial and final set times were also measured using ASTM C403 penetration tests. Concrete mix design is summarized in Table 1. Natural gravel with a maximum size of 9.525 mm was used as coarse aggregate, and silica sand with a maximum size of 0.85 mm was used as fine aggregate.

TABLE 1

Concrete Mixture Components for Example 2

| | Mix ingredients | Control concrete (C) | Glass concrete (CG) | Glass concrete with sodium bicarbonate (CG + SB) |
|---|---|---|---|---|
| | | Relative weight | | |
| Concrete mix design | Cement (type I)/binder | 1 | 0.7 | 0.7 |
| | Silica sand/binder | 1.6 | 1.6 | 1.6 |
| | Gravel/binder | 1.7 | 1.7 | 1.7 |
| | Water/binder | 0.5 | 0.5 | 0.5 |
| | Glass/binder | 0 | 0.3 | 0.27 |
| | Sodium bicarbonate/binder | 0 | 0 | 0.03 |

The experimental results indicate that sodium bicarbonate renders desired effects, in particular providing compressive strength and set time values that are (a) substantially improved relative to recycled glass concrete ("neat glass" in FIGS. 4 and 5) without the reactive particulate sodium bicarbonate powder and (b) comparable to a control concrete ("normal concrete" in FIGS. 4 and 5) without partial replacement (i.e., cement alone as the cementitious binder). Given the unexpectedly good results obtained with sodium bicarbonate, the replacement level of cement with augmented milled waste glass was increased from 20 wt. % (in Example 1) to 30 wt. %, noting that the augmented milled waste glass incorporates 90 wt. % glass and 10 wt. % sodium bicarbonate. Accordingly, the bicarbonate-containing cementitious binder of Example 2 included 70 wt. % Portland cement, 27 wt. % waste glass and 3 wt. % sodium bicarbonate.

Calcium chloride, an effective set-accelerator which has lost ground in concrete applications due to its adverse effects on corrosion of steel in concrete, was used as a control material in the experimental program reviewed below for comparison with sodium bicarbonate. The chloride-containing cementitious binder of Example 2 included 70 wt. % Portland cement, 27.9 wt. % waste glass and 2.1 wt. % calcium chloride.

Figure 4:
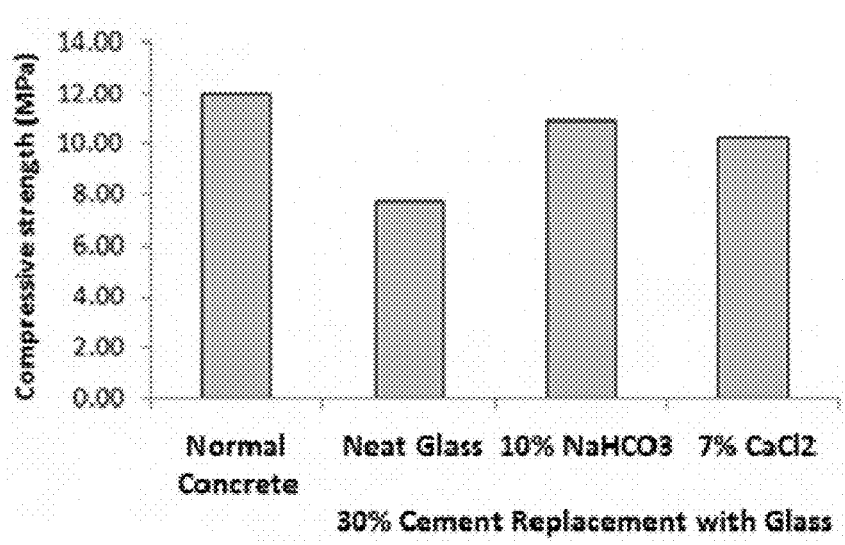
FIG. 4 is a graph illustrating one-day compressive strength test results for cementitious compositions incorporating a milled waste glass as partial replacement for cement with or without one or more reactive particulates according to the disclosure (30 wt. % replacement level).

The one-day compressive strength test results are presented in FIG. 4. Use of neat glass (without any augmentation) as replacement for 30 wt. % of cement is observed to significantly reduce the 1-day compressive strength of concrete. Augmentation of milled waste glass with 10% sodium bicarbonate is observed to raise the 1-day compressive strength of recycled glass concrete to levels close to that of normal concrete. Sodium bicarbonate is observed in FIG. 4 to be more effective than calcium chloride in restoring the 1-day compressive strength of recycled glass concrete.

Figure 5:
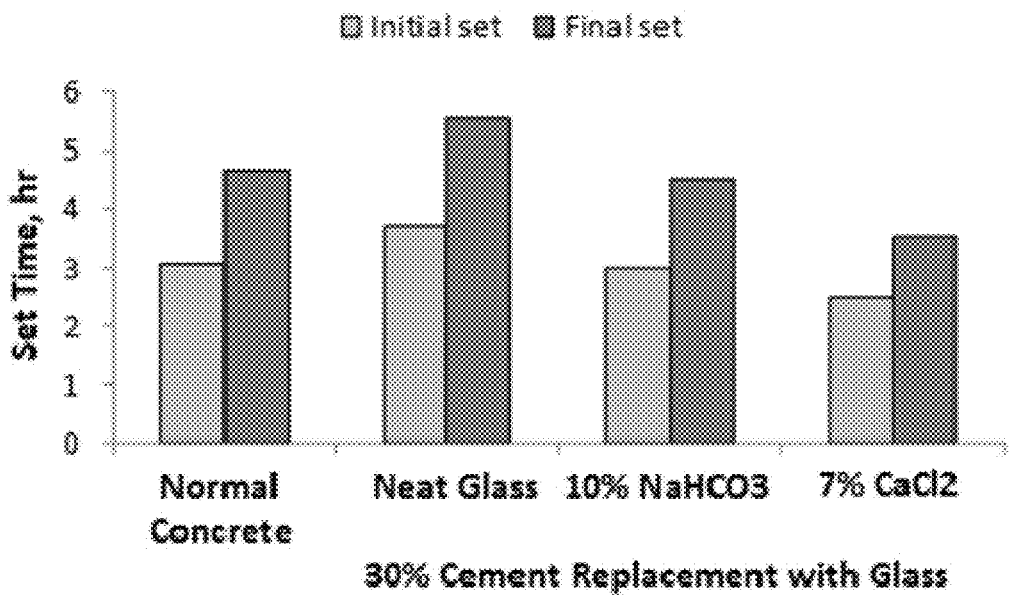
FIG. 5 is a graph illustrating initial and final set time test results for cementitious compositions incorporating a milled waste glass as partial replacement for cement with or without one or more reactive particulates according to the disclosure (30 wt. % replacement level).

The set time test results are presented in FIG. 5. Neat milled waste glass (when used at 30 wt. % replacement for cement) causes an undesirable increase in the set time of concrete. Augmentation of milled waste glass with 10 wt. % sodium bicarbonate (i.e., 3 wt. % of total cementitious binder) and also with calcium chloride reduce the initial and final set times of recycled glass concrete to levels comparable to those of normal concrete.

Example 3

Landfill-bound mixed-color waste glass can be augmented with a relatively low dosage of abundantly available minerals, and milled to micro-scale particle size for use as a partial replacement for cement in concrete. 'Recycled glass concrete' offers important advantages over conventional concrete in terms of performance, cost and sustainability. The impermeability and durability of recycled glass concrete surpass those of conventional concrete.

Production of cement is a highly energy-intensive and polluting process, which accounts for about 6% of anthropogenic $CO_2$ emissions worldwide, and close to 2% of worldwide primary energy use. The disclosed cementitious binder offers the potential to reduce global greenhouse gas emissions by about 1.2%. Recycled glass servers as a chemically reactive constituent, used as partial replacement for cement in concrete; the approach to augmentation of waste glass with a reactive particulate material (e.g., bicarbonate or carbonate mineral or salt) restores the rate of chemical reactions. The cementitious binder transforms potentially deleterious reactions between cement alkalis and the (amorphous) silica constituent of glass into beneficial chemical reactions which substantially improve the chemical stability of concrete.

In recycled glass concrete, cement is partially replaced with milled (mixed-color) waste glass (e.g., about 5 wt. % to 50 wt. % or about 10 wt. % to 30 wt. % waste glass relative to total cementitious binder, where the waste glass is further augmented with the reactive particulate material) to reduce its significant environmental impact and energy demand, and to render important benefits to the performance and economics of the vast concrete-based infrastructure. The otherwise landfill-bound quantities of waste glass are adequate to significantly impact the concrete construction practice. The contributions of milled waste glass to the impermeability and durability qualities of concrete translate into increased service life of the concrete-based infrastructure, yielding life-cycle environmental, energy and cost benefits.

Figure 6:
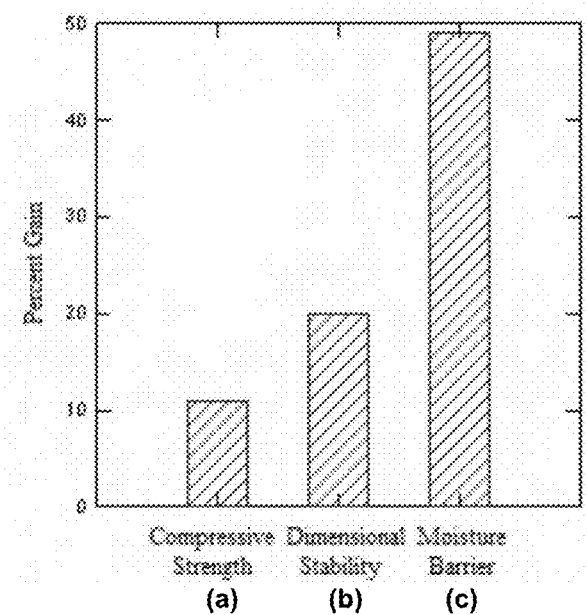
FIG. 6 is a graph illustrating percent gains in concrete properties resulting from partial replacement of cement with augmented milled waste glass: (a) compressive strength, (b) dimensional stability, and (c) moisture barrier properties.

Use of milled waste glass (without any augmentation) as partial replacement for cement in concrete has some negative implications. The rate of setting and hardening of concrete tends to be reduced in the presence of milled waste glass, which delays the construction process. Partial replacement of cement with milled waste glass also increases the alkalinity of pore solution, which could induce adverse alkali-silica reactions involving reactive constituents of some aggregates. Low-cost and abundantly available reactive particulate materials such as bicarbonates and/or carbonates (e.g., limestone powder), used at a small fractions of glass weight, can be used to overcome these problems. Partial replacement of cement with such milled waste glass that is augmented with the reactive particulates yields desired rates of concrete setting/hardening, and lowers the alkalinity of concrete pore solution. These benefits are realized as a result of carbonation reactions occurring parallel with hydration and pozzolanic reactions, and incorporation of alkali metal cations into the products of hydration and pozzolanic reactions. FIG. 6 presents the percent gains in some key concrete properties, measured in laboratory and field studies, resulting from partial replacement of cement with augmented milled waste glass (about 80 wt. % Portland cement, 19 wt. % milled waste glass, and 1 wt. % milled calcium carbonate).

Waste glass is generated largely in urban areas, where the bulk of concrete production also occurs (e.g., in ready-mixed and precast concrete plants). This proximity reduces the economic, energy and environmental impacts of hauling the waste glass intended for use in concrete. Urban areas in the United States consume close to 80 million tons of cement annually (in 2014), which (at approximate 20% replacement level of cement with milled waste glass) can consume all of the (mixed-color) waste glass that is land-filled in the United States. Key applications of concrete in urban areas include: (i) cast-in-place residential and commercial construction (slabs-on-grade, footings, walls, etc.), and rigid pavements; and (ii) precast sewer infrastructure (pipes, manholes, etc.), masonry units, wall panels, and (reinforced and prestressed) structural elements. The primary needs and circumstances favoring partial replacement of cement with milled waste glass include: (i) cost savings realized by the use of supplementary cementitious materials, noting that milled waste glass can be produced at about half the price of cement; (ii) the growing prevalence of environmental and energy considerations among factors influencing owners' decisions on selection of infrastructure systems and materials; (iii) the significant governmental energy and environmental credits that can be realized by incorporating waste glass (a post-consumer waste) into concrete; and (iv) the growing emphasis of major owners of the concrete-based infrastructure (municipalities and businesses) on maintenance and replacement (life-cycle) costs, noting that milled waste glass significantly benefits the service life and thus the life-cycle economy of concrete-based infrastructure.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

REFERENCES

1. Baxter et al. U.S. Pat. No. 5,810,921.
2. Johnston, C., "Waste glass as coarse aggregate for concrete," ASTM Journal of Testing and Evaluation, 1974. 2(5).

What is claimed is:

1. A cementitious binder composition comprising:
   (a) a cement;
   (b) a particulate glass composition having an average particle size ranging from about 1 μm to about 100 μm; and
   (c) a reactive particulate composition comprising sodium bicarbonate, the reactive particulate composition having an average particle size ranging from about 1 μm to about 100 μm.

2. The cementitious binder composition of claim 1, wherein the cement is present in an amount ranging from about 50 wt. % to about 95 wt. % relative to the cementitious binder composition.

3. The cementitious binder composition of claim 1, wherein the cement has an average particle size ranging from about 2 μm to about 25 μm.

4. The cementitious binder composition of claim 1, wherein the cement comprises a hydraulic cement selected from the group consisting of general use (GU) hydraulic cement, high early strength (HE) hydraulic cement, moderate sulfate resistance (MS) hydraulic cement, high sulfate resistance (HS) hydraulic cement, moderate heat of hydration (MH) hydraulic cement, low heat of hydration (LH) hydraulic cement, and combinations thereof.

5. The cementitious binder composition of claim 1, wherein the cement comprises Portland cement.

6. The cementitious binder composition of claim 1, further comprising a supplementary cementitious material selected from the group consisting of fly ash, ground granulated blast furnace slag, silica fume, rice husk ash, metakaolin, spent fluid catalytic cracking catalyst, and combinations thereof.

7. The cementitious binder composition of claim 1, wherein the particulate glass composition is present in an amount ranging from about 5 wt. % to about 50 wt. % relative to the cementitious binder composition.

8. The cementitious binder composition of claim 1, wherein the particulate glass composition has an average particle size ranging from about 5 μm to about 25 μm.

9. The cementitious binder composition of claim 1, wherein the particulate glass composition comprises mixed-color waste glass.

10. The cementitious binder composition of claim 1, wherein the particulate glass composition comprises a soda-lime glass.

11. The cementitious binder composition of claim 1, wherein the reactive particulate composition is present in an amount ranging from about 0.1 wt. % to about 20 wt. % relative to the cementitious binder composition.

12. The cementitious binder composition of claim 1, wherein the reactive particulate composition has an average particle size ranging from about 5 μm to about 20 μm.

13. The cementitious binder composition of claim 1, wherein the reactive particulate composition is dissolved and reacted in an alkaline environment of the cementitious binder.

14. The cementitious binder composition of claim 1, wherein the ratio of the average particle size of the reactive particulate composition to the average particle size of the particulate glass composition ranges from about 0.1 to about 5.

15. The cementitious binder composition of claim 1, wherein the cementitious binder composition is in the form of a particulate composition substantially free from water.

16. The cementitious binder composition of claim 1, wherein the cementitious binder composition further comprises water.

17. A cementitious binder composition comprising:
   (a) a hydraulic cement comprising Portland cement;
   (b) a particulate glass composition present in an amount ranging from about 5 wt. % to about 50 wt. % relative to the cementitious binder composition and having an average particle size ranging from about 1 μm to about 100 μm; and
   (c) a particulate sodium bicarbonate composition present in an amount ranging from about 0.5 wt. % to about 10 wt. % relative to the cementitious binder composition and having an average particle size ranging from about 1 μm to about 100 μm.

18. The cementitious binder composition of claim 17, wherein the hydraulic cement is present in an amount ranging from about 50 wt. % to about 95 wt. % relative to the cementitious binder composition.

19. The cementitious binder composition of claim 17, wherein the hydraulic cement has an average particle size ranging from about 2 μm to about 25 μm.

20. The cementitious binder composition of claim 17, further comprising a supplementary cementitious material selected from the group consisting of fly ash, ground granulated blast furnace slag, silica fume, rice husk ash, metakaolin, spent fluid catalytic cracking catalyst, and combinations thereof.

21. The cementitious binder composition of claim 17, wherein the particulate glass composition has an average particle size ranging from about 5 μm to about 25 μm.

22. The cementitious binder composition of claim 17, wherein the particulate sodium bicarbonate composition has an average particle size ranging from about 5 μm to about 20 μm.

23. A concrete composition comprising:
   (a) the cementitious binder composition according to claim 1; and
   (b) aggregates.

24. The concrete composition of claim 23, wherein the aggregates are selected from the group consisting of crushed stone, gravel, sand, light-weight aggregates, heavy-weight aggregates, synthetic particles, recycled particles, and combinations thereof.

25. The concrete composition of claim 23, wherein the aggregates are present in an amount ranging from about 25 wt. % to about 1000 wt. % relative to the cementitious binder.

26. The concrete composition of claim 23, wherein the concrete composition is in the form of a particulate composition substantially free from water.

27. The concrete composition of claim 23, wherein the concrete composition further comprises water.

28. The concrete composition of claim 27, wherein the water is present in an amount ranging from about 10 wt. % to about 65 wt. % relative to the cementitious binder composition.

29. The concrete composition of claim 26, wherein the concrete composition further comprises one or more additives selected from the group consisting of chemical additives, mineral additives, fibrous additives, and combinations thereof.

30. A cured binder composition comprising: at least one of hydration, pozzolanic and carbonation reaction products of the cementitious binder composition according to claim 1 and water.

31. A cured concrete composite composition comprising:
  (a) a matrix comprising at least one of hydration, pozzolanic and carbonation reaction products of the cementitious binder composition according toclaim 1 and water;
  (b) aggregates distributed throughout the matrix; and
  (c) optionally one or more additives selected from the group consisting of chemical additives, mineral additives, fibrous additives, and combinations thereof.

32. A method for curing a cementitious binder composition, the method comprising:
  (a) casting a cementitious binder composition further comprising water according to claim 16 into a mold; and
  (b) curing the cementitious binder composition for a selected period, thereby forming a cured cement-based composition comprising a cementitious matrix comprising at least one of hydration, pozzolanic and carbonation reaction products of the cementitious binder composition and the water therein.

33. The method of claim 32, wherein:
  (i) the cementitious binder composition is in the form of a concrete composition further comprising aggregates; and
  (ii) curing the concrete composition for the selected period forms a cured concrete composition comprising the cementitious matrix and the aggregates embedded within the cementitious matrix.

* * * * *